(12) United States Patent
Descubes

(10) Patent No.: US 8,685,126 B2
(45) Date of Patent: Apr. 1, 2014

(54) DEVICE FOR FILTERING THE INTAKE AIR OF AN INTERNAL COMBUSTION ENGINE HAVING VENTILATION MEANS

(75) Inventor: Olivier Pierre Descubes, Nay (FR)

(73) Assignee: Turbomeca, Bordes (FR)

( * ) Notice: Subject to any disclaimer, the term of this patent is extended or adjusted under 35 U.S.C. 154(b) by 72 days.

(21) Appl. No.: 13/500,011

(22) PCT Filed: Oct. 14, 2010

(86) PCT No.: PCT/EP2010/065392
§ 371 (c)(1),
(2), (4) Date: Apr. 3, 2012

(87) PCT Pub. No.: WO2011/045363
PCT Pub. Date: Apr. 21, 2011

(65) Prior Publication Data
US 2012/0192533 A1    Aug. 2, 2012

(30) Foreign Application Priority Data

Oct. 14, 2009   (FR) ..................................... 09 57208

(51) Int. Cl.
| | |
|---|---|
| B64D 33/00 | (2006.01) |
| B64D 33/02 | (2006.01) |
| F02C 7/04 | (2006.01) |
| F02C 7/052 | (2006.01) |
| F02B 61/00 | (2006.01) |
| F02B 61/04 | (2006.01) |

(52) U.S. Cl.
USPC ............. 55/306; 55/347; 55/385.1; 55/385.3; 55/511; 96/397; 60/39.092; 60/796; 244/23 R; 244/53 B; 415/121.2; 29/889.02

(58) Field of Classification Search
USPC ........ 55/306, 347, 385.1, 385.3, 511; 96/397; 60/39.092, 796; 244/23 R, 53 B; 415/121.2; 29/889.02
See application file for complete search history.

(56) References Cited

U.S. PATENT DOCUMENTS

| | | | |
|---|---|---|---|
| 3,016,109 A | | 1/1962 | Howard |
| 3,035,792 A | * | 5/1962 | Klapproth .................... 244/23 R |
| 3,148,043 A | * | 9/1964 | Richardson et al. ............ 55/306 |
| 3,421,296 A | | 1/1969 | Beurer, Sr. |
| 3,616,616 A | * | 11/1971 | Flatt ................................ 55/306 |
| 3,756,019 A | | 9/1973 | Holzapfel et al. |

(Continued)

FOREIGN PATENT DOCUMENTS

| | | |
|---|---|---|
| FR | 2 097 170 | 3/1972 |
| FR | 2 613 772 | 10/1988 |
| FR | 2 904 046 | 1/2008 |
| GB | 2 257 752 | 1/1993 |
| WO | 2006 059987 | 6/2006 |

*Primary Examiner* — Frank Lawrence, Jr.
*Assistant Examiner* — Minh-Chau Pham
(74) *Attorney, Agent, or Firm* — Oblon, Spivak, McClelland, Maier & Neustadt, L.L.P.

(57) ABSTRACT

A device for filtering intake air of an internal combustion engine, including at least one filtering element including an inlet for air being treated, a first clean air outlet toward the engine, and a second air outlet toward the outside, and a ventilation mechanism driving the air from the second air outlet. The ventilation mechanism includes a fan wheel driven by a turbine set into motion by a gas flow taken from the engine.

8 Claims, 1 Drawing Sheet

(56) References Cited

U.S. PATENT DOCUMENTS

| | | | |
|---|---|---|---|
| 4,255,174 A * | 3/1981 | Simpson | 55/347 |
| 7,927,408 B2 * | 4/2011 | Sheoran et al. | 96/397 |
| 8,240,121 B2 * | 8/2012 | Hazzard et al. | 60/39.092 |
| 2003/0024233 A1 * | 2/2003 | Snyder | 60/39.092 |
| 2007/0151214 A1 * | 7/2007 | Stelzer et al. | 55/306 |
| 2009/0007528 A1 * | 1/2009 | Wilson | 55/306 |
| 2009/0145101 A1 | 6/2009 | Suciu et al. | |
| 2009/0261208 A1 * | 10/2009 | Belyew | 244/53 B |

* cited by examiner

DEVICE FOR FILTERING THE INTAKE AIR OF AN INTERNAL COMBUSTION ENGINE HAVING VENTILATION MEANS

BACKGROUND OF THE INVENTION

1. Field of the Invention

The present invention relates to the field of internal combustion engines and more particularly to that of gas turbine engines as used in aviation, especially on helicopters. It concerns the treatment of the intake air of such engines.

2. Description of the Related Art

A helicopter may be required to maneuver in an environment heavily charged with free particles, for example of sand or dust. When it is close to the ground, during takeoff or landing, it raises and causes to be suspended in the air a large quantity of particles which are ingested by the engines. The engines suffer from impaired performance and are subjected to serious corrosion by the particles passing through them.

In order to restrict this phenomenon, it is known to provide devices, referred to as sand filters, for treating the intake air of the engine, by means of which the particles suspended in the aspirated air are separated therefrom and evacuated.

A known sand filter is of the vortex type. It comprises a parallelepipedic or annular chamber in which are disposed tubular filtering elements crossing from one wall of the chamber to the other, in which filtering elements the air is subjected to a swirling motion. A first, axial, outlet communicates with the inlet channel of the engine and a second, lateral, outlet opens into the interior of the chamber. The interior of this chamber is ventilated to ensure that the air charged with particles is evacuated to the outside.

The ventilation, referred to as secondary, is effected by a device for impelling the air charged with particles, the throughput of which device may amount to as much as 10% of the throughput of the engine.

The known devices include a fan driven by an electric motor, the electrical energy being drawn from the engine itself or from the helicopter. The current supply requires cutoff, control and protection systems. Thus, although this device is very flexible, allowing the power demand to be managed according to the needs and phases of flight, it is relatively heavy and inconvenient to install from the point of view of wiring and electrical control.

Another known solution consists in providing ventilation by means of an ejector using a venturi. The flow required to operate the ejector is drawn from a high-pressure stage of the engine. This system has the advantage of being very reliable and having relatively low weight. However, the take-off from the high-pressure stage is very costly in terms of performance, and reduces the flight envelope of the engine.

BRIEF SUMMARY OF THE INVENTION

It is the object of the applicant to achieve the ventilation throughput of the vortex filtering system using a means which does not have the disadvantages of the prior art.

It is also the object to provide a ventilation device offering a better compromise between mass, impact on engine performance, cost and ease of repair, as compared to the prior art.

These objects are achieved with a device for filtering the intake air of an internal combustion engine comprising at least one filtering element having an inlet for air being treated, a first clean air outlet towards the engine and the second air outlet towards the outside, a ventilation means impelling the air from said second outlet, characterized in that the ventilation means includes a fan wheel driven by a turbine set in motion by a gas flow taken from the engine, the turbine and the fan wheel being arranged concentrically with respect to one another.

The use of the turbine allows the amount of air drawn off to be reduced in relation to systems using an ejector; the pressure level of the gas flow may be that of an intermediate compression level or even of a lower turbine stage.

In particular, the blades forming the turbine are arranged radially on the outside of a ring connecting the outer ends of the fan blades.

A one-piece assembly which is economical to maintain can be achieved in this way.

Advantageously, the turbine is of the action type.

In this way the need for gas-tightness between the two flows passing respectively through the turbine and the fan wheel is reduced.

According to a preferred embodiment, the fan wheel and the turbine form a rotor mounted in a casing in which are provided a central channel for ventilation air and a channel, in the form of at least one ring sector, for supplying the turbine. In particular, the fan wheel and the turbine form a rotor at the end of a central shaft mounted in a nose cone of said casing.

The gas may preferably be drawn off either at the compressor or between the power turbine and the high-pressure turbine, or between the stages of the power turbine.

BRIEF DESCRIPTION OF THE SEVERAL VIEWS OF THE DRAWINGS

Further characteristics and advantages will be apparent from the following description of a non-limiting embodiment with reference to the drawings, in which.

DETAILED DESCRIPTION OF THE INVENTION

Figure 1:
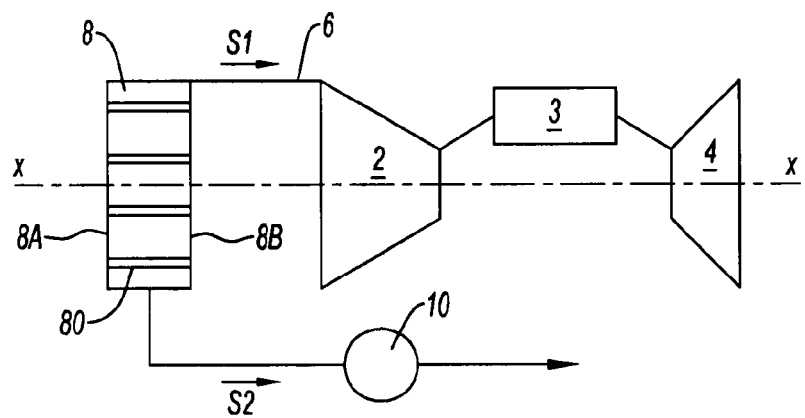
FIG. 1 shows schematically a vortex filtering device mounted in the air intake of a gas turbine engine.

The diagram of FIG. 1 shows an example of a gas turbine engine having, located successively along its main axis XX, a compression section 2 for the air admitted through the inlet channel 6, a combustion chamber 3 and a turbine section 4. The engine may be a single-spool engine or a multi-spool engine with a low-pressure spool and a high-pressure spool. The compression section may comprise one or more axial stages and/or one or more centrifugal stages. Likewise, the turbine section may comprise one or more in-line stages connected by a central shaft to a corresponding compression stage. The turbine section may comprise a free turbine connected to a power take-off shaft.

A sand filter 8 is mounted across the air intake channel 6. The filter may be parallelepipedic or annular in shape depending on the shape of the inlet channel.

The filter 8 comprises two walls, 8A and 8B, spaced from one another. Air enters through orifices formed in the upstream wall 8A and exits, cleansed of any particles with which it may be charged, through the orifices in the downstream wall 8B. "Downstream" and "upstream" are defined in relation to the circulation of air through the engine.

Figure 2:
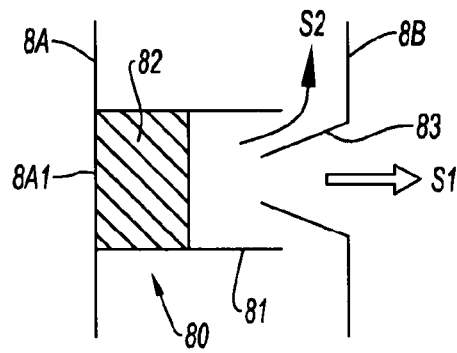
FIG. 2 shows a filtering element of the device of FIG. 1.

To achieve this cleaning, filtering elements 80 are arranged between the two walls, opening into the orifices of the walls 8A and 8B. FIG. 2 shows the operating principle of these elements. An element 80 comprises a tube 81 open to an orifice of the wall 8A. It is provided with vanes 82 suitable for imparting a swirling motion to the air entering through an orifice 8A1 of the wall 8A. At the wall 8B the tube 81 forms an opening, annular in this case, with a frustoconical tube 83. The latter opens on to an orifice formed in the downstream wall 8B. In operation, the air, having passed through the wall 8A, is set in swirling motion in the upstream portion of the tube 81. The particles with which the air may be charged are centrifuged along the internal face of the wall of the tubes 81 and are evacuated with the flow S2 into the space between the tubes 81 and the walls 8A and 8B. At the center of the tube 81, the unpolluted air flow S1 enters the tube 83 and is evacuated through the wall 8B. It is admitted to the channel 6 and is then guided towards the compression section.

In order to ensure ventilation and evacuation of the polluted air to the outside, a fan 10 aspirates the air from inside the chamber of the filter 8 and ejects it.

Figure 3:
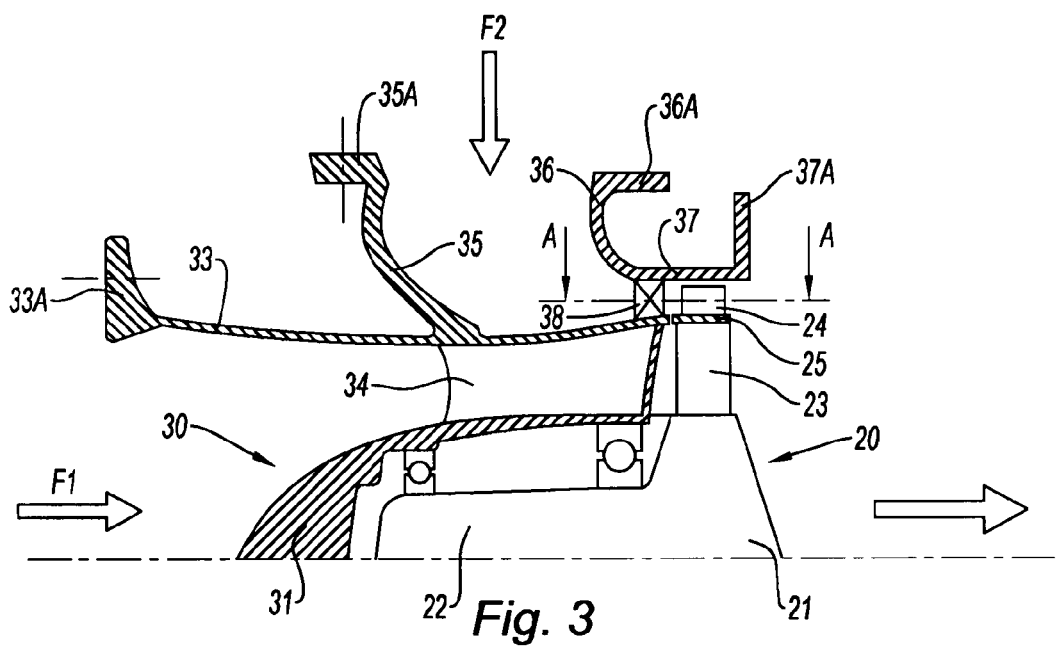
FIG. 3 shows an embodiment of the invention viewed in axial section.

The ventilation module 10 according to the invention is represented in axial section in FIG. 3.

The ventilation module 10 comprises a fan wheel 20 mounted rotatably in a casing 30. The wheel comprises a hub 21 prolonged on one side by a central shaft 22. Fan blades 23, shaped to be traversed axially by air parallel to the axis of the central shaft 22, are fixed radially on the hub 21. Axial-flow turbine blades 24 are arranged radially on the periphery of this wheel formed by the fan blades 23. A ring 25 separates the flow of ventilation air from the gas flow passing the turbine blades in the axial direction. The wheel may advantageously be implemented as an integral structure by machining from a single block.

The central shaft 22 is mounted rotatably in a cantilevered manner in a nose cone 31 of the casing 30. The casing includes a first cylindrical shell 33 which defines, with the nose cone 31, a first annular channel for an axial air flow F1. Guide vanes 34 connect the surface of the nose cone 31 radially to the shell 33. The air stream for the flow F1 has an opening corresponding to that of the air stream traversed by the fan blades 23. The shell is prolonged downstream by the flow separation ring 25.

Figure 4:
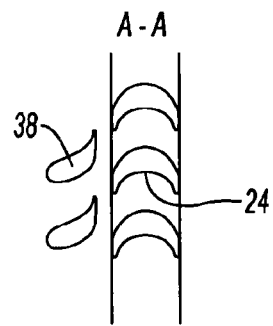
FIG. 4 is a view along the section line A-A of FIG. 3.

Outside the shell 33, the casing defines a second channel concentric with the first channel and having two wall elements 35 and 36. Viewed in axial section, the wall 35 forms an elbow with a radial inlet, which elbow joins the cylindrical wall tangentially. The wall 36, spaced radially from the wall 35, also forms an elbow with a radial inlet, which elbow joins tangentially a cylindrical wall 37 having a radius greater than that of the cylindrical wall 33. This second channel therefore has a radial inlet and an axial outlet. The second channel, for the gas flow F2, has the shape of a ring sector, or is annular. The cylindrical wall forms a sealing ring around the rotor 1. More particularly, it forms a sealing ring for the turbine blades 24, having a minimum clearance from the tips thereof. Guide vanes 38 form gas injectors in the direction of the turbine blades 24. The turbine is preferably an action turbine with gas pressure reduction in the injectors 38. In this way the problems of sealing between the flows F1 and F2 passing through the fan rotor 20 are avoided. FIG. 4 shows, in a section along the line A-A of FIG. 3, the shape of the turbine blades 24 and that of the guide vanes 38 forming injectors.

Upstream flanges 33A allow the device to be mounted on a conduit from the sand filter. Flanges 35A and 36A allow mounting to a conduit communicating with a take-off on the motor, and flanges 37A enable attachment to an evacuation conduit.

During operation of the engine, the ventilation device 10 receives gases F2 taken from the engine which are guided by the second channel towards the turbine blades which they set in motion, driving the fan wheel. Through rotation of the fan wheel, the ventilation blades 23 aspirate the air F1 from inside the filter 8. The two flows F1 and F2 are combined downstream of the wheel 20 and directed to the outside.

In summary, by means of its architecture the device according to the invention makes available a wheel which is easily removed, thus simplifying maintenance procedures, and makes possible a machine having a small number of parts. For example, replacement of the rotor 21 can be easily effected from the rear.

The use of an action turbine in turn allows the distributor to be simplified, tolerating partial injection, the nozzle of which may be produced by simple drilling; it also limits the impact of leaks through the low-pressure delta on the wheel.

Advantageously, gas take-off points may be located either:
  between the high-pressure turbine(s) and the power turbine(s),
  in the inter-stage zone of the power turbine (in the case of a multi-stage turbine),
  at different stages on the compressor.

The invention claimed is:

1. A device for filtering intake air of an internal combustion engine, comprising:
    at least one filtering element including an inlet for air being treated, a first clean air outlet towards the engine, and a second air outlet towards the outside;
    a ventilation device that impels the air from the second air outlet,
    wherein the ventilation device includes a fan wheel rotatably mounted in a casing and driven by a turbine which is set in motion by a gas flow taken from the engine, the turbine and the fan wheel being arranged concentrically with respect to one another,
    wherein the casing includes a cylindrical shell, a first wall forming an elbow with a radial inlet that joins the cylindrical shell, and a second wall forming an elbow with a radial inlet that joins a cylindrical wall having a radius greater than a radius of the cylindrical shell,
    wherein an inner circumferential surface of the cylindrical shell defines a first annular channel for a first air flow, and an outer circumferential surface of the cylindrical shell and the first and second walls define a second annular channel for a second air flow, the second annular channel having a radial inlet and an axial outlet, and
    wherein the first air flow aspirates the air from inside the at least one filtering element, and the second air flow is the gas flow taken from the engine for driving the fan wheel via the turbine.

2. The device as claimed in claim 1, wherein blades forming the turbine are disposed radially outside a ring connecting outer ends of the blades.

3. The device as claimed in claim 2, wherein the turbine is of action type.

4. The device as claimed in claim 1, wherein the fan wheel and the turbine form a rotor at an end of a central shaft mounted in a nose cone of the casing.

5. The device as claimed in claim 1, wherein the engine is a gas turbine engine, and gas is taken off either at a compressor, or between a power turbine and a high-pressure turbine, or between stages of the power turbine.

6. The device as claimed in claim 1, wherein the cylindrical shell includes an upstream flange which is mounted on a conduit from the at least one filtering element.

7. The device as claimed in claim 1, wherein the first and second walls include flanges which are mounted to a conduit communicating with a take-off on the engine.

8. The device as claimed in claim 1, wherein a downstream end of the cylindrical wall includes a flange which is mounted to an evacuation conduit.

* * * * *